United States Patent
Koga (10) Patent No.: US 10,651,700 B2
(45) Date of Patent: May 12, 2020

(54) ROTATING ELECTRICAL MACHINE

(71) Applicant: AISIN AW CO., LTD., Anjo-shi, Aichi-ken (JP)

(72) Inventor: Kiyotaka Koga, Anjo (JP)

(73) Assignee: AISIN AW & CO., LTD., Anjo (JP)

( * ) Notice: Subject to any disclaimer, the term of this patent is extended or adjusted under 35 U.S.C. 154(b) by 371 days.

(21) Appl. No.: 15/545,986

(22) PCT Filed: Mar. 24, 2016

(86) PCT No.: PCT/JP2016/059468
§ 371 (c)(1),
(2) Date: Jul. 24, 2017

(87) PCT Pub. No.: WO2016/153002
PCT Pub. Date: Sep. 29, 2016

(65) Prior Publication Data
US 2018/0026487 A1    Jan. 25, 2018

(30) Foreign Application Priority Data

Mar. 24, 2015 (JP) .................................. 2015-060426
Mar. 27, 2015 (JP) .................................. 2015-065597

(51) Int. Cl.
*H02K 3/12* (2006.01)
*H02K 3/28* (2006.01)
(Continued)

(52) U.S. Cl.
CPC .................. *H02K 3/12* (2013.01); *H02K 1/16* (2013.01); *H02K 1/274* (2013.01); *H02K 3/28* (2013.01); *H02K 3/48* (2013.01); *H02K 15/085* (2013.01)

(58) Field of Classification Search
CPC .. H02K 3/12; H02K 3/28; H02K 3/48; H02K 1/16; H02K 1/274; H02K 15/085;
(Continued)

(56) References Cited

U.S. PATENT DOCUMENTS

2006/0152188 A1 *   7/2006   Yasuhara .................. H02K 3/28
                                                              318/727
2009/0140594 A1      6/2009   Ogawa et al.
(Continued)

FOREIGN PATENT DOCUMENTS

EP       2063515 A2       5/2009
JP     2005-124375 A      5/2005
(Continued)

OTHER PUBLICATIONS

Jun. 21, 2016 International Search Report issued in International Patent Application No. PCT/JP2016/059468.

*Primary Examiner* — Alfonso Perez Borroto
*Assistant Examiner* — Alexander A Singh
(74) *Attorney, Agent, or Firm* — Oliff PLC (57) ABSTRACT

In this rotating electrical machine, each of coil centers of a first concentric coil and a third concentric coil is located on one side in a circumferential direction with respect to a center of a magnetic pole, and each of coil centers of a second concentric coil and a fourth concentric coil is located on the other side in the circumferential direction with respect to the center of the magnetic pole.

13 Claims, 9 Drawing Sheets

(51) Int. Cl.
*H02K 1/16* (2006.01)
*H02K 1/27* (2006.01)
*H02K 3/48* (2006.01)
*H02K 15/085* (2006.01)

(58) Field of Classification Search
CPC .. H02K 1/08; H02K 3/14; H02K 3/16; H02K 3/18; H02K 3/20; H02K 3/22; H02K 3/30; H02K 3/32; H02K 3/325; H02K 3/34; H02K 3/345; H02K 3/38; H02K 3/46; H02K 3/487; H02K 3/493; H02K 3/50; H02K 3/505; H02K 3/52; H02K 3/521; H02K 3/522; H02K 3/524; H02K 3/525; H02K 3/527; H02K 3/528
USPC .................................................. 310/156.01
See application file for complete search history.

(56) References Cited

U.S. PATENT DOCUMENTS

2014/0125187 A1    5/2014   Suzuki et al.
2014/0346914 A1   11/2014   Funasaki et al.

FOREIGN PATENT DOCUMENTS

| JP | 2012-125043 A | 6/2012 |
| JP | 2014-096857 A | 5/2014 |
| WO | 2013/157115 A1 | 10/2013 |

* cited by examiner

FIG. 1

FIRST (SECOND) EMBODIMENT

FIG. 2

FIRST (SECOND) EMBODIMENT

ROTATING ELECTRICAL MACHINE

TECHNICAL FIELD

The present disclosure relates to rotating electrical machines.

BACKGROUND ART

Conventionally, rotating electrical machines are known which include concentric coils of the same phase connected in parallel with each other.

A plurality of concentric coils (e.g., first to fourth round wire concentric coils) formed by concentrically winding a round wire and connected in parallel with each other are conventionally known in the art. Each of the first to fourth round wire concentric coils includes a plurality of coils (hereinafter referred to as the coil portions) connected in series with each other. The first to fourth round wire concentric coils are placed in slots of a stator core in order of the plurality of coil portions of the first round wire concentric coil, the plurality of coil portions of the second round wire concentric coil, the plurality of coil portions of the third round wire concentric coil, and the plurality of coil portions of the fourth round wire concentric coil (namely, the coils are wound around adjacent poles).

For example, in the case where the central axis of a rotor is not aligned with the central axis of a stator, the positional relationship between each permanent magnet placed in the rotor and each of the first to fourth round wire concentric coils may be imbalanced. In this case, a circulating current flows in the concentric coil, which results in generation of noise and vibration, etc.

In order to overcome this disadvantage, one of the coil portions of the first round wire concentric coil, one of the coil portions of the second round wire concentric coil, one of the coil portions of the third round wire concentric coil, and one of the coil portions of the fourth round wire concentric coil are conventionally placed in this order in the slots of the stator core (namely, the coils are wound around every other pole). This eliminates the imbalance in the positional relationship between each permanent magnet and each of the first to fourth round wire concentric coils and thus reduces generation of noise and vibration due to a circulating current in the concentric coil.

Conventionally, rotating electrical machines are also known which include a concentric coil formed by concentrically winding a rectangular wire. Such a rotating electrical machine is disclosed in, e.g., Japanese Patent Application Publication No. 2012-125043 (JP 2012-125043 A).

JP 2012-125043 A discloses a motor including a first concentric coil and a second concentric coil which are formed by concentrically winding a rectangular wire. The first concentric coil is formed by winding a rectangular wire so as to create a clearance between adjacent ones of the turns of the rectangular wire so that the rectangular wire of the second concentric coil can be inserted in the clearances. That is, in JP 2012-125043 A, portions of the rectangular wire of the first concentric coil and portions of the rectangular wire of the second concentric coil are alternately placed in each slot of a stator core in the radial direction of the stator core.

Related Art Documents

Patent Documents

Patent Document 1: Japanese Patent Application Publication No. 2012-125043 (JP 2012-125043 A)

SUMMARY

Problem to be Solved

In the motor of JP 2012-125043 A, however, since the rectangular wire of the first concentric coil and the rectangular wire of the second concentric coil are mixedly present in each slot, it is difficult to wind the coils around every other pole in order to eliminate an imbalance in the positional relationship between each permanent magnet and each of the first and second concentric coils. It is therefore desired to reduce noise and vibration due to a circulating current in a concentric coil in rotating electrical machines including a concentric coil formed by concentrically winding a rectangular wire.

The present disclosure was developed in order to solve the above problems, and it is one object of the present disclosure to provide a rotating electrical machine that includes a concentric coil formed by concentrically winding a wire and that can reduce generation of noise and vibration due to a circulating current in the concentric coil.

Means for Solving the Problem

In order to achieve the above object, a rotating electrical machine according to one aspect of the present disclosure includes: a rotor core having a permanent magnet placed therein; a stator core placed so as to face the rotor core in a radial direction and having a plurality of slots; and a concentric coil formed by concentrically winding a wire and placed in the slots of the stator core. The concentric coil includes a first concentric coil and a second concentric coil which are of the same phase and are connected in series with each other, and a third concentric coil and a fourth concentric coil which are of the same phase and are connected in series with each other. The first concentric coil and the second concentric coil are connected in parallel with the third concentric coil and the fourth concentric coil. Each of coil centers of the first concentric coil and the third concentric coil is located on one side in a circumferential direction with respect to a center of a magnetic pole, and each of coil centers of the second concentric coil and the fourth concentric coil is located on the other side in the circumferential direction with respect to the center of the magnetic pole.

In the rotating electrical machine according to the aspect of the present disclosure, of the first concentric coil and the second concentric coil which are connected in series with each other and the third concentric coil and the fourth concentric coil which are connected in series with each other, each of the coil centers of the first concentric coil and the third concentric coil is located on the one side in the circumferential direction with respect to the center of the magnetic pole, and each of the coil centers of the second concentric coil and the fourth concentric coil is located on the other side in the circumferential direction with respect to the center of the magnetic pole, as described above. This prevents the first concentric coil and the second concentric coil which are connected in series with each other (the third concentric coil and the fourth concentric coil which are connected in series with each other) from being unevenly placed only on the one side or the other side in the circumferential direction with respect to the centers of the magnetic poles, and thus can eliminate an imbalance in the positional relationship between each permanent magnet and the concentric coil. As a result, generation of noise and vibration due to a circulating current in the concentric coil can be reduced in the rotating electrical machine including the concentric coil formed by concentrically winding a wire.

According aspects of the present disclosure, as described above, generation of noise and vibration due to a circulating current in a concentric coil can be reduced in a rotating electrical machine including a concentric coil formed by concentrically winding a wire.

DETAILED DESCRIPTION

Various embodiments will be described below based on the drawings.

First Embodiment (Structure of Rotating Electrical Machine)

The structure of a rotating electrical machine 100 according to a first embodiment will be described with reference to FIGS. 1 to 7.

Figure 1:
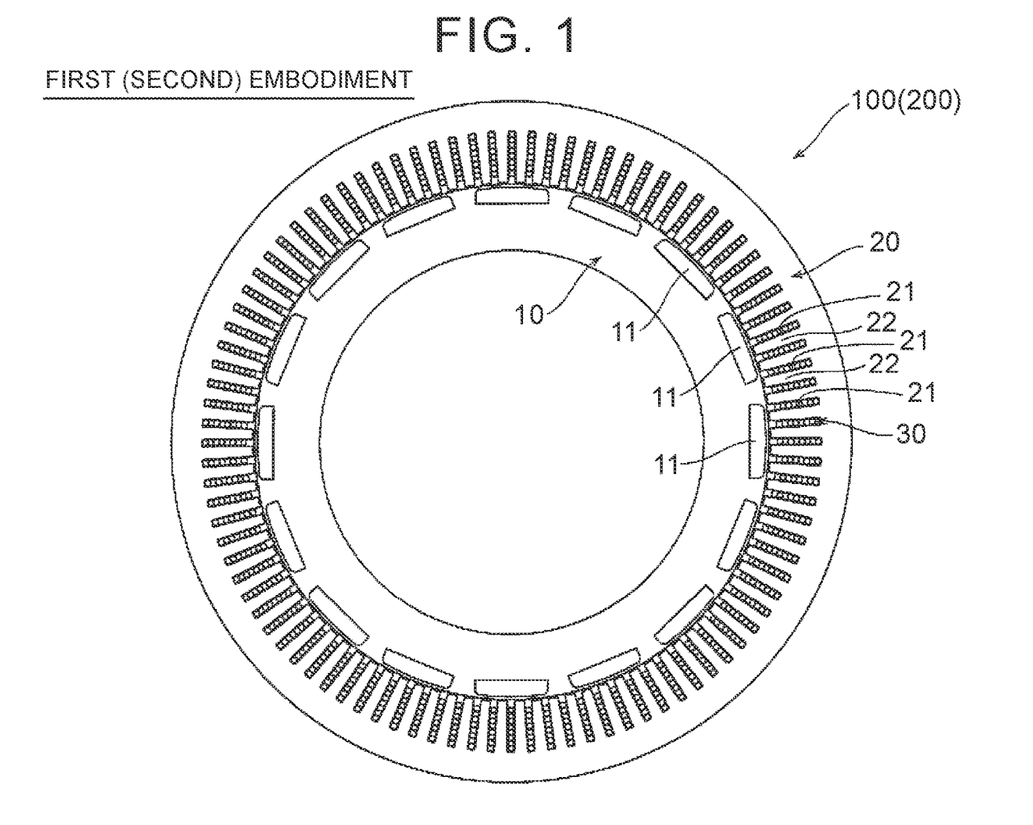
FIG. 1 is a plan view of a rotating electrical machine according to first and second embodiments.

As shown in FIG. 1, the rotating electrical machine 100 includes a rotor core 10. The rotor core 10 has a plurality of (e.g., 16) permanent magnets 11 arranged therein in the circumferential direction. In the first embodiment, the plurality of permanent magnets 11 are arranged at substantially regular angular intervals (intervals of about 22.5 degrees) in the circumferential direction of the rotor core 10.

The rotating electrical machine 100 includes a stator core 20. The stator core 20 is placed so as to face the rotor core 10 in the radial direction. The stator core 20 has a plurality of (e.g., 96) slots 21. The stator core 20 has teeth 22 each located between adjacent ones of the slots 21.

The rotating electrical machine 100 includes a concentric coil 30 formed by concentrically winding a rectangular wire. The concentric coil 30 is placed in the slots 21 of the stator core 20.

Figure 4:
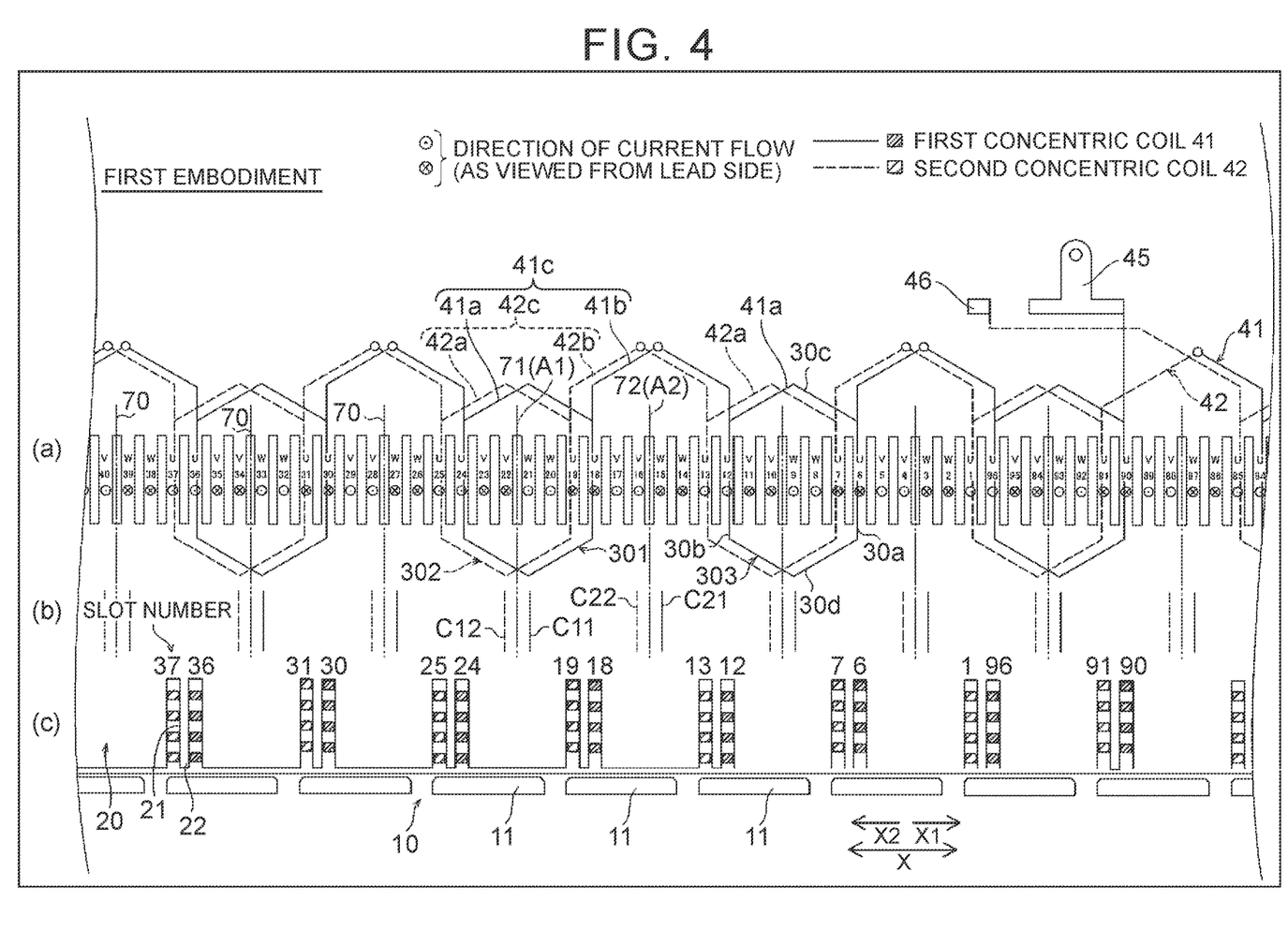
FIG. 4 is a partial enlarged view of FIG. 3, showing only a first concentric coil and a second concentric coil.

As shown in FIG. 4, the concentric coil 30 is a continuous coil comprised of a first slot accommodated portion 30a that is accommodated in a predetermined slot 21 and a second slot accommodated portion 30b that is accommodated in a slot 21 different from the predetermined slot 21 with both a first coil end portion 30c and a second coil end portion 30d between the first slot accommodated portion 30a and the second slot accommodated portion 30b. The first coil end portion 30c is a coil end portion that forms a coil end located on one side in the axial direction, and the second coil end portion 30d is a coil end portion that forms a coil end located on the other side in the axial direction. Specifically, the concentric coil 30 is a coil formed by continuously winding a single wire so as to form the first slot accommodated portion 30a, the first coil end portion 30c, the second slot accommodated portion 30b, and the second coil end portion 30d.

Figure 2:
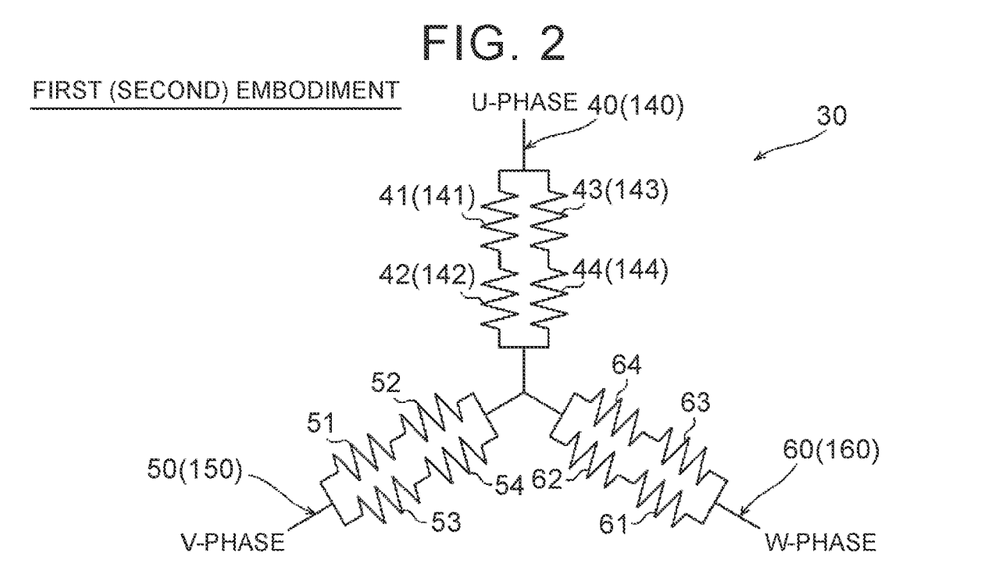
FIG. 2 is a circuit diagram of three-phase concentric coils connected in a Y-configuration according to the first and second embodiments.
Figure 3:
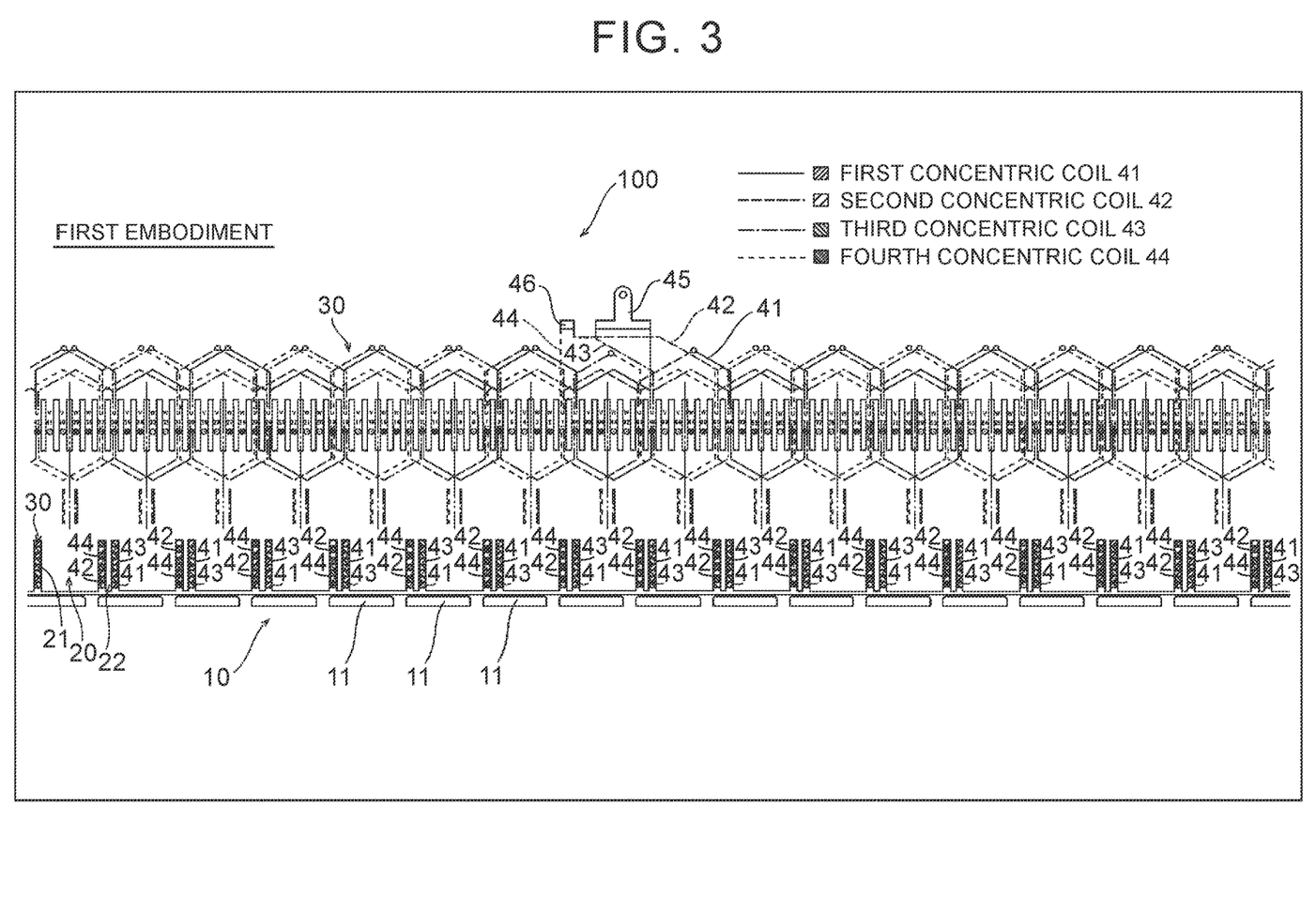
FIG. 3 is a diagram showing a U-phase concentric coil placed in slots according to the first embodiment.

As shown in FIG. 2, the concentric coil 30 includes a U-phase concentric coil 40, a V-phase concentric coil 50, and a W-phase concentric coil 60. The U-phase concentric coil 40 includes a first concentric coil 41 and a second concentric coil 42 which are of the same phase (U-phase) and are connected in series with each other, and a third concentric coil 43 and a fourth concentric coil 44 which are of the same phase (U-phase) and are connected in series with each other. The first concentric coil 41 and the second concentric coil 42 which are connected in series with each other are connected in parallel with the third concentric coil 43 and the fourth concentric coil 44 which are connected in series with each other.

The V-phase concentric coil 50 includes a first concentric coil 51 and a second concentric coil 52 which are of the same phase (V-phase) and are connected in series with each other, and a third concentric coil 53 and a fourth concentric coil 54 which are of the same phase (V-phase) and are connected in series with each other. The first concentric coil 51 and the second concentric coil 52 which are connected in series with each other are connected in parallel with the third concentric coil 53 and the fourth concentric coil 54 which are connected in series with each other.

The W-phase concentric coil 60 includes a first concentric coil 61 and a second concentric coil 62 which are of the same phase (W-phase) and are connected in series with each other, and a third concentric coil 63 and a fourth concentric coil 64 which are of the same phase (W-phase) and are connected in series with each other. The first concentric coil 61 and the second concentric coil 62 which are connected in series with each other are connected in parallel with the third concentric coil 63 and the fourth concentric coil 64 which are connected in series with each other.

In the first embodiment, the U-phase concentric coil 40, the V-phase concentric coil 50, and the W-phase concentric coil 60 are connected in a Y configuration.

Since the U-phase concentric coil 40, the V-phase concentric coil 50, and the W-phase concentric coil 60 are placed in the slots 21 in similar configurations, the U-phase concentric coil 40 will be described below.

(Structure of U-Phase Concentric Coil)

The first to fourth concentric coils 41 to 44 will be described with reference to FIGS. 3 to 6. FIG. 4 shows only the U-phase first concentric coil 41 and the U-phase second concentric coil 42 of the U-phase concentric coil 40. FIG. 4(a) shows the slots 21 and the first concentric coil 41 and the second concentric coil 42 which are placed in the slots 21. FIG. 4(b) shows the centers (shown by long dashed double-short dashed lines) of magnetic poles 70 and the positions of coil centers (C11, C12) and connection centers (C21, C22) with respect to the centers (A1, A2) of the magnetic poles 70. The "connection center" is also the "center between two coil centers connected together." FIG. 4(c) shows the first concentric coil 41 and the second concentric coil 42 which are formed by a rectangular wire and placed in the slots 21. FIG. 4(c) also shows the positional relationship of the permanent magnets 11 with the slots 21. The numbers shown on top of the slots 21 in FIG.

Figure 5:
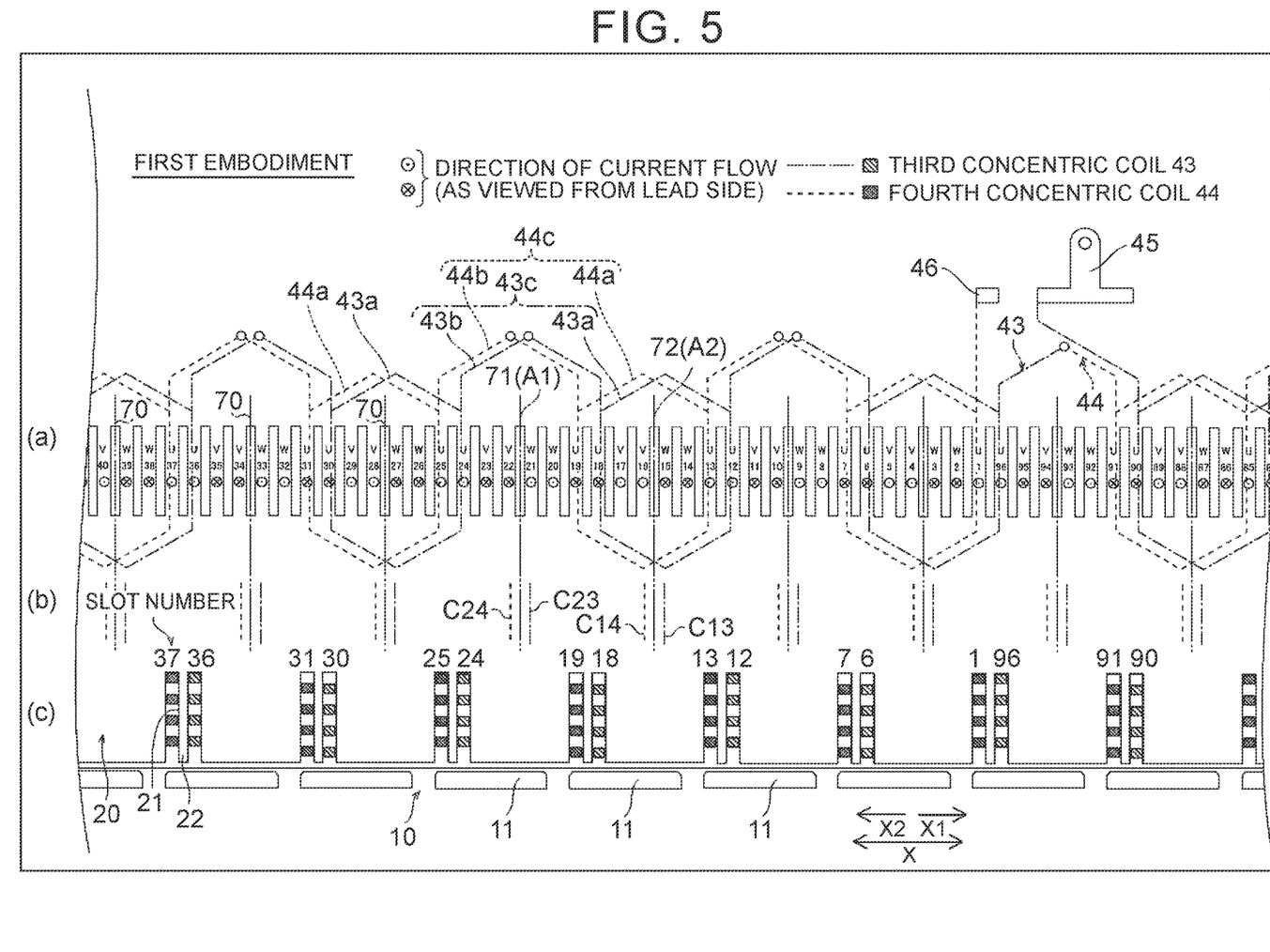
FIG. 5 is a partial enlarged view of FIG. 3, showing only a third concentric coil and a fourth concentric coil.

4(c) denote slot numbers. FIG. 5 shows only the U-phase third concentric coil 43 and the U-phase fourth concentric coil 44 of the U-phase concentric coil 40.

As shown in FIG. 4, the coil center (C11, C12) means a line segment extending in the axial direction and passing through the middle in the circumferential direction between the first slot accommodated portion 30a that is accommodated in the predetermined slot 21 and the second slot accommodated portion 30b that is accommodated in the slot 21 different from the predetermined slot 21 in the concentric coil 30. In the present embodiment, since the concentric coil 30 has a substantially hexagonal shape, bent parts of the first coil end portion 30c and the second coil end portion 30d correspond to the coil center. However, the present embodiment is not limited to this, and the coil center means a line segment extending in the axial direction and passing through the middle in the circumferential direction between the first slot accommodated portion 30a that is accommodated in the predetermined slot 21 and the second slot accommodated portion 30b that is accommodated in the slot 21 different from the predetermined slot 21.

In the first embodiment, as shown in FIG. 4, the coil center C11 of the first concentric coil 41 is located on one side (X1 direction side) in the circumferential direction with respect to the center A1 of the magnetic pole 70 (first magnetic pole 71). The coil center C12 of the second concentric coil 42 is located on the other side (X2 direction side) in the circumferential direction with respect to the center A1 of the first magnetic pole 71. As shown in FIG. 5, the coil center C13 of the third concentric coil 43 is located on the one side (X1 direction side) in the circumferential direction with respect to the center A2 of a second magnetic pole 72. The coil center C14 of the fourth concentric coil 44 is located on the other side (X2 direction side) in the circumferential direction with respect to the center A2 of the second magnetic pole 72.

Specifically, as shown in FIG. 4, the coil center C11 of the first concentric coil 41 is located at a position shifted by approximately ½ of the slot width toward the one side (X1 direction side) in the circumferential direction with respect to the center A1 of the first magnetic pole 71, and the coil center C12 of the second concentric coil 42 is located at a position shifted by approximately ½ of the slot width toward the other side (X2 direction side) in the circumferential direction with respect to the center A1 of the first magnetic pole 71. For example, the first concentric coil 41 is placed in the slot 21 of slot number 24 and the slot 21 of slot number 18. That is, the pitch of the first concentric coil 41 is 6 slots. The second concentric coil 42 is placed in the slot 21 of slot number 25 and the slot 21 of slot number 19. That is, the pitch of the second concentric coil 42 is 6 slots.

The centers of the magnetic poles will be described. As shown in FIG. 4, a first concentric coil 301 and a second concentric coil 302 are concentric coils 30 that are of the same phase out of a plurality of phases (e.g., in the case of a three-phase configuration, three phases, namely U-phase, V-phase, and W-phase) formed by different concentric coils 30 and that are located next to each other in the circumferential direction. The first concentric coil 301 and the second concentric coil 302 have first slot accommodated portions 30a that are accommodated in adjacent ones of the slots 21 and second slot accommodated portions 30b that are accommodated in adjacent ones of the slots 21 which are separated by a predetermined interval in the circumferential direction from the slots 21 of the first slot accommodated portions 30a. In each of the first concentric coil 301 and the second concentric coil 302, the same wire is continuously wound to form the first slot accommodated portion 30a and the second slot accommodated portion 30b. The center (A1) of the magnetic pole means a line segment extending in the axial direction and passing through the middle in the circumferential direction between the coil centers of the concentric coil 301 and the second concentric coil 302 which are of the same phase and are located next to each other in the circumferential direction. The first concentric coil 301 is connected via a connection portion 41b to a first concentric coil 303 of the same phase which is accommodated in slots 21 separated in the circumferential direction from the slots 21 of the first concentric coil 301, and the center (A2) of the magnetic pole means a line segment extending in the axial direction and passing through the middle in the circumferential direction between the centers of these concentric coils including the connection portion 41b.

As shown in FIG. 5, the coil center C13 of the third concentric coil 43 is located at a position shifted by approximately ½ of the slot width toward the one side (X1 direction side) in the circumferential direction with respect to the center A2 of the second magnetic pole 72 adjacent to the first magnetic pole 71, and the coil center C14 of the fourth concentric coil 44 is located at a position shifted by approximately ½ of the slot width toward the other side (X2 direction side) in the circumferential direction with respect to the center A2 of the second magnetic pole 72. For example, the third concentric coil 43 is placed in the slot 21 of slot number 18 and the slot 21 of slot number 12. That is, the pitch of the third concentric coil 43 is 6 slots. The fourth concentric coil 44 is placed in the slot 21 of slot number 19 and the slot 21 of slot number 13. That is, the pitch of the fourth concentric coil 44 is 6 slots.

The rotating electrical machine 100 thus has the first concentric coil 41 and the third concentric coil 43 in one slot 21 and has the second concentric coil 42 and the fourth concentric coil 44 in one slot 21.

In the first embodiment, as shown in FIG. 4, the first concentric coil 41 includes a plurality of coil portions 41a formed by concentrically winding a rectangular wire, and connection portions 41b each connecting the coil portions 41a. The connection center C21 in the connection portion 41b is located at a position shifted by approximately ½ of the slot width toward the one side (X1 direction side) in the circumferential direction with respect to the center A2 of the second magnetic pole 72. For example, the connection portion 41b is placed so as to extend in the circumferential direction from the slot 21 of slot number 18 to the slot 21 of slot number 12. That is, the pitch of the connection portion 41b is 6 slots.

The second concentric coil 42 includes a plurality of coil portions 42a formed by concentrically winding a rectangular wire, and connection portions 42b each connecting the coil portions 42a. The connection center C22 in the connection portion 42b is located at a position shifted by approximately ½ of the slot width toward the other side (X2 direction side) in the circumferential direction with respect to the center A2 of the second magnetic pole 72. For example, the connection portion 42b is placed so as to extend in the circumferential direction from the slot 21 of slot number 19 to the slot 21 of slot number 13. That is, the pitch of the connection portion 42b is 6 slots.

As shown in FIG. 5, the third concentric coil 43 includes a plurality of coil portions 43a formed by concentrically winding a rectangular wire, and connection portions 43b each connecting the coil portions 43a. The connection center C23 in the connection portion 43b is located at a position shifted by approximately ½ of the slot width toward the one side (X1 direction side) in the circumferential direction with respect to the center A1 of the first magnetic pole 71. For example, the connection portion 43b is placed so as to extend in the circumferential direction from the slot 21 of slot number 24 to the slot 21 of slot number 18. That is, the pitch of the connection portion 43b is 6 slots.

The fourth concentric coil 44 includes a plurality of coil portions 44a formed by concentrically winding a rectangular wire, and connection portions 44b each connecting the coil portions 44a. The connection center C24 in the connection portion 44b is located at a position shifted by approximately ½ of the slot width toward the other side (X2 direction side) in the circumferential direction with respect to the center A1 of the first magnetic pole 71. For example, the connection portion 44b is placed so as to extend in the circumferential direction from the slot 21 of slot number 25 to the slot 21 of slot number 19. That is, the pitch of the connection portion 44b is 6 slots.

In the first embodiment, as shown in FIGS. 4 and 5, a plurality of sets 41c (42c, 43c, 44c) of the coil portion 41a (42a, 43a, 44a) and the connection portion 41b (42b, 43b, 44b) are arranged in the circumferential direction.

Figure 6:
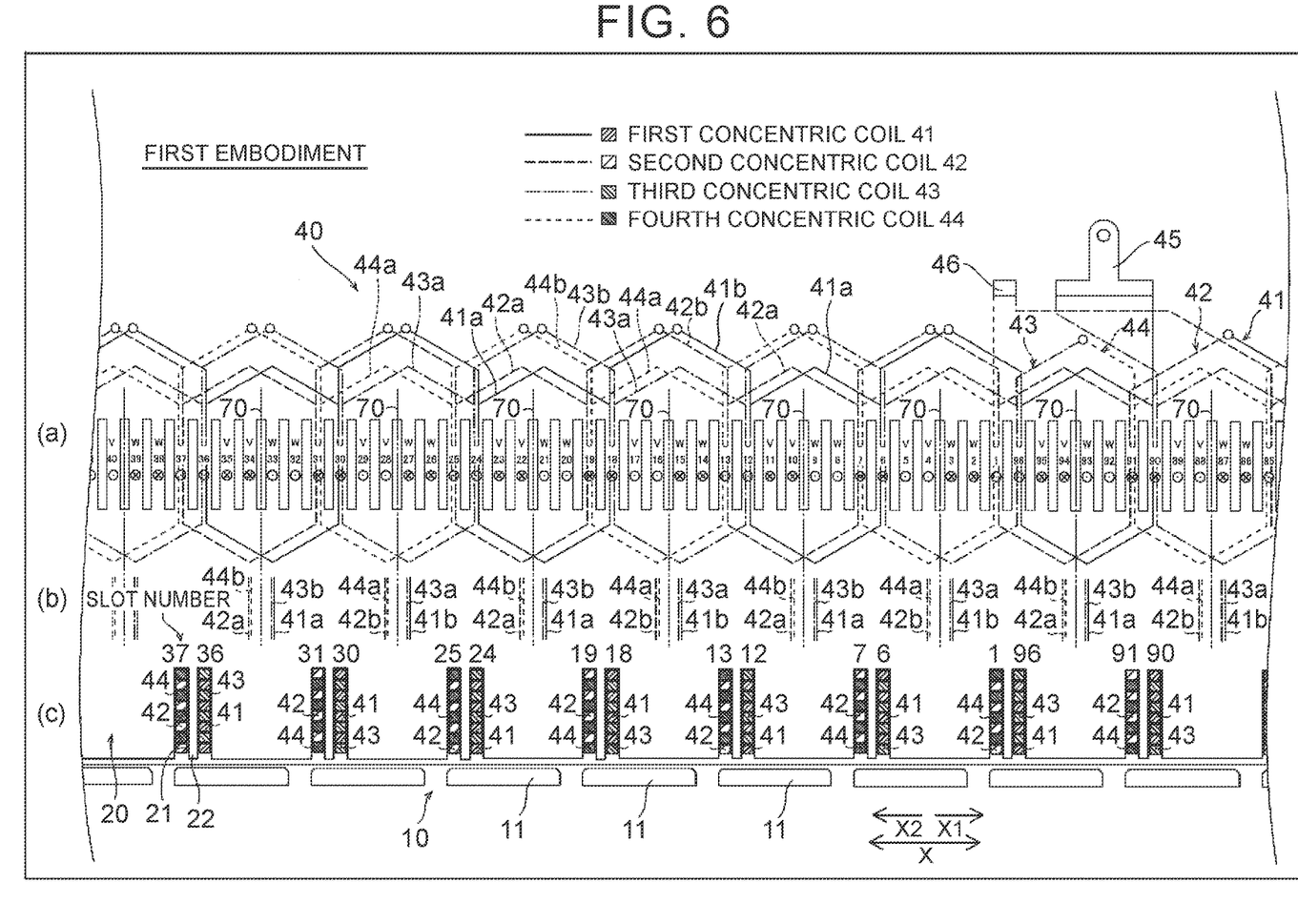
FIG. 6 is a partial enlarged view of FIG. 3.
Figure 7:
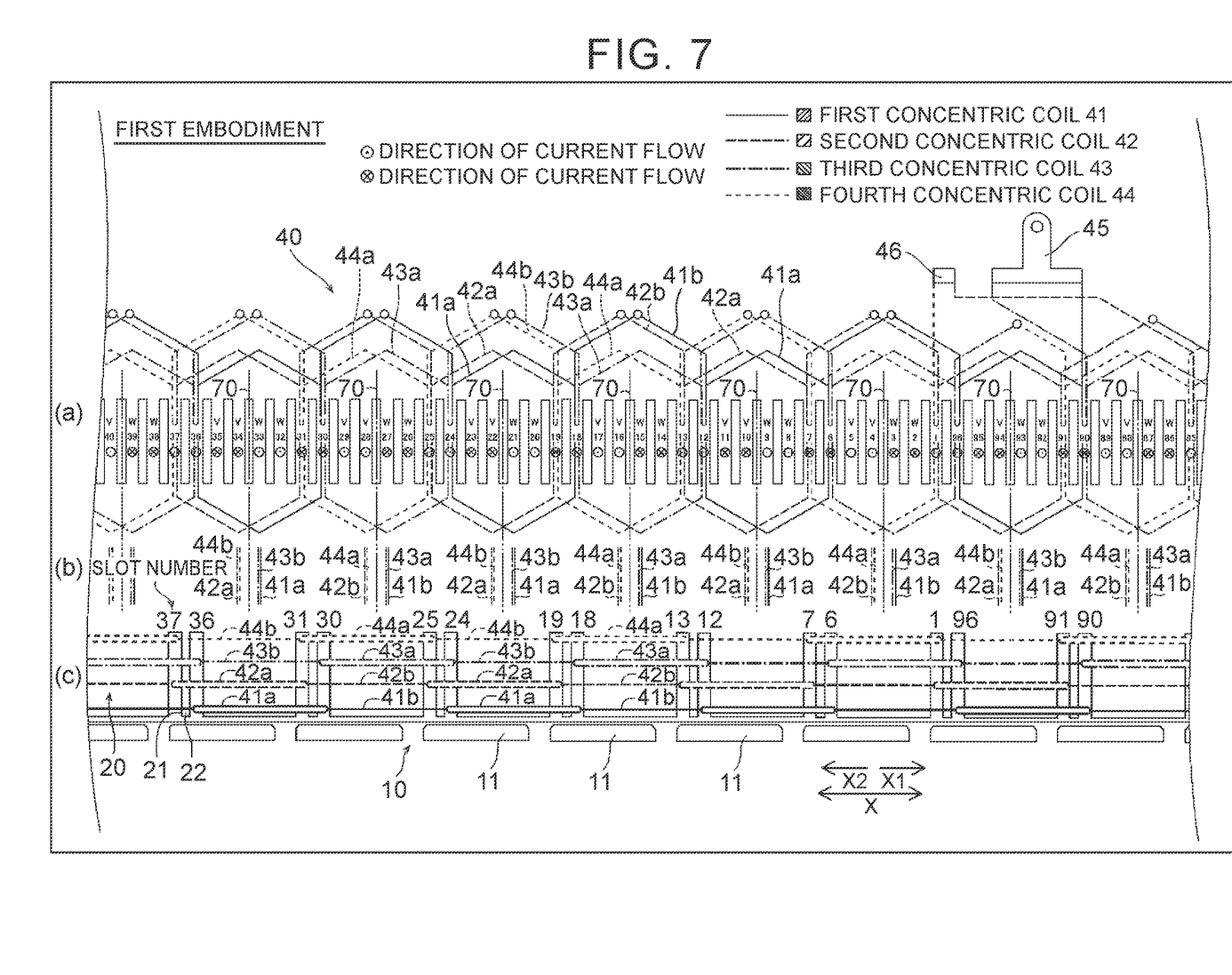
FIG. 7 is a partial enlarged view of FIG. 3, schematically illustrating how the first to fourth concentric coils are arranged.

As shown in FIGS. 4 and 6, the first concentric coil 41 placed in the slot 21 of slot number 84 and the second concentric coil 42 placed in the slot 21 of slot number 91 are connected in series with each other. As shown in FIGS. 5 and 6, the third concentric coil 43 placed in the slot 21 of slot number 96 and the fourth concentric coil 44 placed in the slot 21 of slot number 91 are connected in series with each other.

As shown in FIGS. 4 to 6, the first concentric coil 41 placed in the slot 21 of slot number 90 (a portion corresponding to the connection portion 41b) and the third concentric coil 43 placed in the slot 21 of slot number 90 (a portion corresponding to the connection portion 43b) are connected to a power line 45. The second concentric coil 42 placed in the slot 21 of slot number 85 (a portion corresponding to the connection portion 42b) and the fourth concentric coil 44 placed in the slot 21 of slot number 1 (a portion corresponding to the connection portion 44b) are connected to a neutral line 46. The first concentric coil 41 and the third concentric coil 43 may be connected to the neutral line 46, and the second concentric coil 42 and the fourth concentric coil 44 may be connected to the power line 45.

(Structure of V-phase and W-phase Concentric Coils)

The V-phase concentric coil 50 and the W-phase concentric coil 60 have a structure similar to that of the U-phase concentric coil 40. That is, in the first embodiment, each of the coil centers of the first concentric coil 51 and the third concentric coil 53 of the V-phase concentric coil 50 is located on the one side in the circumferential direction with respect to the center of the magnetic pole 70, and each of the coil centers of the second concentric coil 52 and the fourth concentric coil 54 of the V-phase concentric coil 50 is located on the other side in the circumferential direction with respect to the center of the magnetic pole 70. Each of the coil centers of the first concentric coil 61 and the third concentric coil 63 of the W-phase concentric coil 60 is located on the one side in the circumferential direction with respect to the center of the magnetic pole 70, and each of the coil centers of the second concentric coil 62 and the fourth concentric coil 64 of the W-phase concentric coil 60 is located on the other side in the circumferential direction with respect to the center of the magnetic pole 70.

Effects of First Embodiment

The first embodiment has the following effects. Although effects of the U-phase concentric coil 40 are described below, the V-phase concentric coil 50 and the W-phase concentric coil 60 also have effects similar to those of the U-phase concentric coil 40.

In the first embodiment, of the first concentric coil 41 and the second concentric coil 42 which are connected in series with each other and the third concentric coil 43 and the fourth concentric coil 44 which are connected in series with each other, each of the coil centers C11, C13 of the first concentric coil 41 and the third concentric coil 43 is located on the one side in the circumferential direction with respect to the center of the magnetic pole 70, and each of the coil centers C12, C14 of the second concentric coil 42 and the fourth concentric coil 44 is located on the other side in the circumferential direction with respect to the center of the magnetic pole 70, as described above. This prevents the first concentric coil 41 and the second concentric coil 42 which are connected in series with each other (the third concentric coil 43 and the fourth concentric coil 44 which are connected in series with each other) from being unevenly placed only on the one side or the other side in the circumferential direction with respect to the centers of the magnetic poles 70, and thus can eliminate an imbalance in the positional relationship between each permanent magnet 11 and the concentric coil 40. As a result, generation of noise and vibration due to a circulating current in the concentric coil 40 can be reduced in the rotating electrical machine 100 including the concentric coil 40 formed by concentrically winding a rectangular wire. Adverse effects on torque of the rotating electrical machine 100 due to the circulating current in the concentric coil 40 can also be reduced.

In the first embodiment, as described above, each of the first concentric coil 41, the second concentric coil 42, the third concentric coil 43, and the fourth concentric coil 44 includes the plurality of coil portions 41a, 42a, 43a, 44a formed by concentrically winding a rectangular wire, and the connection portions 41b, 42b, 43b, 44b connecting the coil portions 41a, 42a, 43a, 44a. The connection center C21 (C23) in the connection portion 41b of the first concentric coil 41 (the connection portion 43b of the third concentric coil 43) is located on the one side in the circumferential direction with respect to the center A1 of the first magnetic pole 71. The connection center C22 (C24) in the connection portion 42b of the second concentric coil 42 (the connection portion 44b of the fourth concentric coil 44) is located on the one side in the circumferential direction with respect to the center A1 of the first magnetic pole 71. Accordingly, the center of the coil portions of a set of the first concentric coil 41 and the second concentric coil 42 and the connection center of a set of the connection portion 41b and the connection portion 42b are located on the centers of the magnetic poles 70. Similarly, the center of the coil portions of a set of the third concentric coil 43 and the fourth concentric coil 44 and the connection center of a set of the connection portion 43b and the connection portion 44b are located on the centers of the magnetic poles 70. This prevents an imbalance in the positional relationship between each permanent magnet 11 and the first to fourth concentric coils 41 to 44 and the connection portions 41b to 44b.

In the first embodiment, as described above, the plurality of sets 41c (42c, 43c, 44c) of the coil portion 41a (42a, 43a, 44a) and the connection portion 41b (42b, 43b, 44b) are arranged in the circumferential direction. This can eliminate an imbalance in the positional relationship between each permanent magnet 11 and the concentric coil 40 along the entire circumference.

In the first embodiment, as described above, the coil center C11 of the first concentric coil 41 is located on the one side in the circumferential direction with respect to the center A1 of the first magnetic pole 71, and the coil center C12 of the second concentric coil 42 is located on the other side in the circumferential direction with respect to the center A1 of the first magnetic pole 71. The coil center C13 of the third concentric coil 43 is located on the one side in the circumferential direction with respect to the center A2 of the second magnetic pole 72 adjacent to the first magnetic pole 71, and the coil center C14 of the fourth concentric coil 44 is located on the other side in the circumferential direction with respect to the center A2 of the second magnetic pole 72. Accordingly, the coil center of the set of the first concentric coil 41 and the second concentric coil 42 and the coil center of the set of the third concentric coil 43 and the fourth concentric coil 44 are located on the centers of the magnetic poles 70, whereby the balanced positional relationship between each permanent magnet 11 and each set can be maintained.

In the first embodiment, as described above, the plurality of permanent magnets 11 are arranged at substantially regular angular intervals in the circumferential direction of the rotor core 10. This prevents the positional relationship between the permanent magnet 11 and the concentric coil 40 to vary from permanent magnet 11 to permanent magnet 11, and can thus eliminate an imbalance in the positional relationship between each of the plurality of permanent magnets 11 and the concentric coil 40.

In the first embodiment, as described above, the concentric coil 30 includes the three-phase concentric coils 40, 50, 60, and each of the three-phase concentric coils 40, 50, 60 includes the first concentric coil 41 (51, 61) and the second concentric coil 42 (52, 62) which are connected in series with each other, and the third concentric coil 43 (53, 63) and the fourth concentric coil 44 (54, 64) which are connected in series with each other. The first concentric coil 41 (51, 61) and the second concentric coil 42 (52, 62) are connected in parallel with the third concentric coil 43 (53, 63) and the fourth concentric coil 44 (54, 64). Each of the coil centers of the first concentric coil 41 (51, 61) and the third concentric coil 43 (53, 63) is located on the one side in the circumferential direction with respect to the center of the magnetic pole 70, and each of the coil centers of the second concentric coil 42 (52, 62) and the fourth concentric coil 44 (54, 64) is located on the other side in the circumferential direction with respect to the center of the magnetic pole 70. This can eliminate an imbalance in the positional relationship between each permanent magnet 11 and the concentric coil 40, 50, 60 in all of the three-phase concentric coils 40, 50, 60.

In the first embodiment, as described above, the three-phase concentric coils 40, 50, 60 are connected in a Y-configuration. This can eliminate an imbalance in the positional relationship between each permanent magnet 11 and the concentric coil 40, 50, 60 in the three-phase concentric coils 40, 50, 60 connected in a Y-configuration.

Second Embodiment

The structure of a rotating electrical machine 200 according to a second embodiment will be described with reference to FIGS. 2 and 8 to 10. Unlike the first embodiment in which the first concentric coil 41 and the second concentric coil 42 whose coil centers C11, C12 are located on one side and the other side of the same first magnetic pole 71 are connected in series with each other, in the rotating electrical machine 200 of the second embodiment, a first concentric coil 141 whose coil center C31 is located on one side of the first magnetic pole 71 and a second concentric coil 142 whose coil center C32 is located on the other side of the second magnetic pole 72 adjacent to the first magnetic pole 71 are connected in series with each other.

In the second embodiment, as shown in FIG. 2, a U-phase concentric coil 140, a V-phase concentric coil 150, and a W-phase concentric coil 160 are connected in a Y-configuration. Since the U-phase concentric coil 140, the V-phase concentric coil 150, and a W-phase concentric coil 160 are placed in the slots 21 in similar configurations, the U-phase concentric coil 140 will be described below.

(Structure of U-Phase Concentric Coil)

Figure 8:
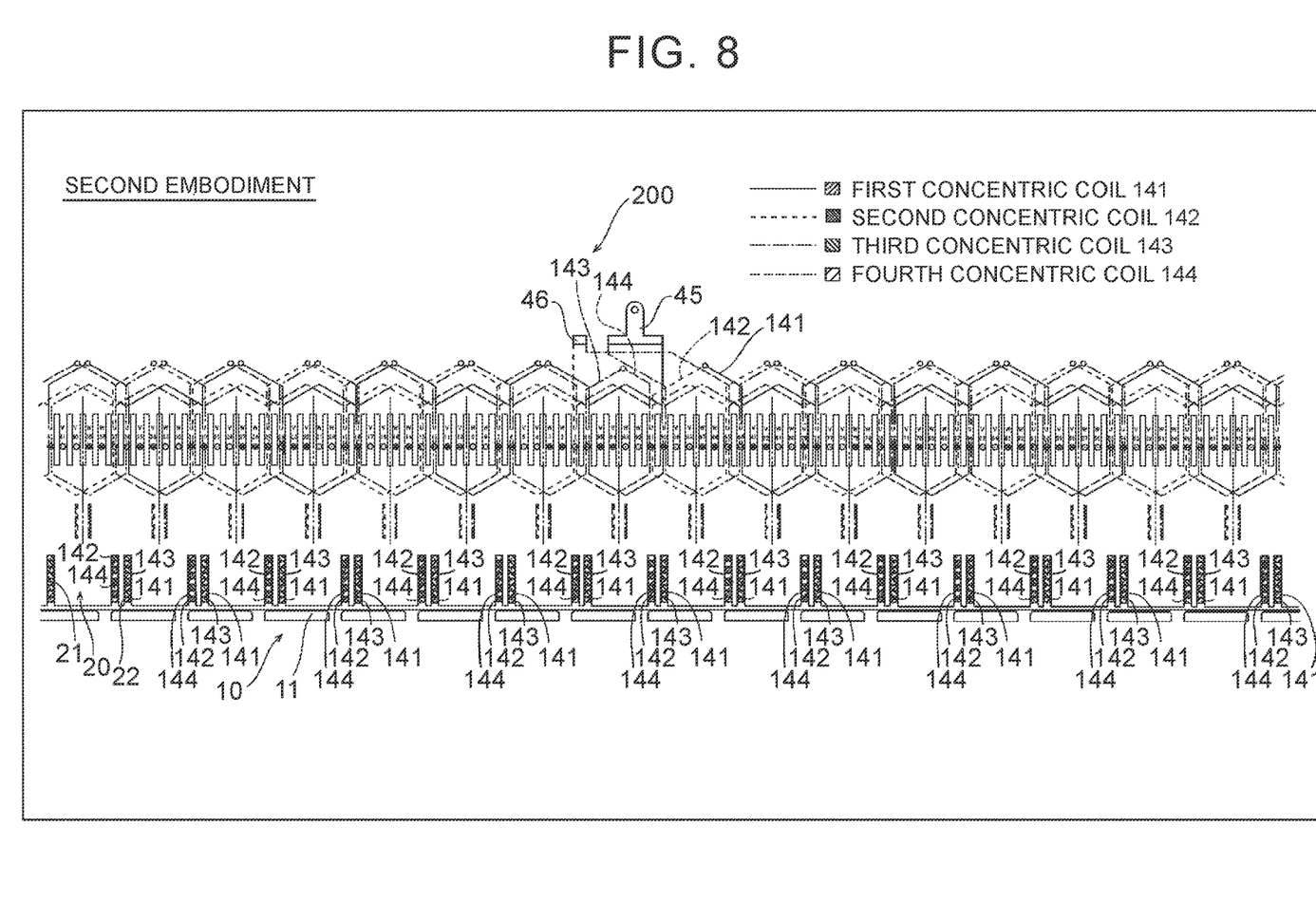
FIG. 8 is a diagram showing a U-phase concentric coil placed in slots according to the second embodiment.
Figure 9:
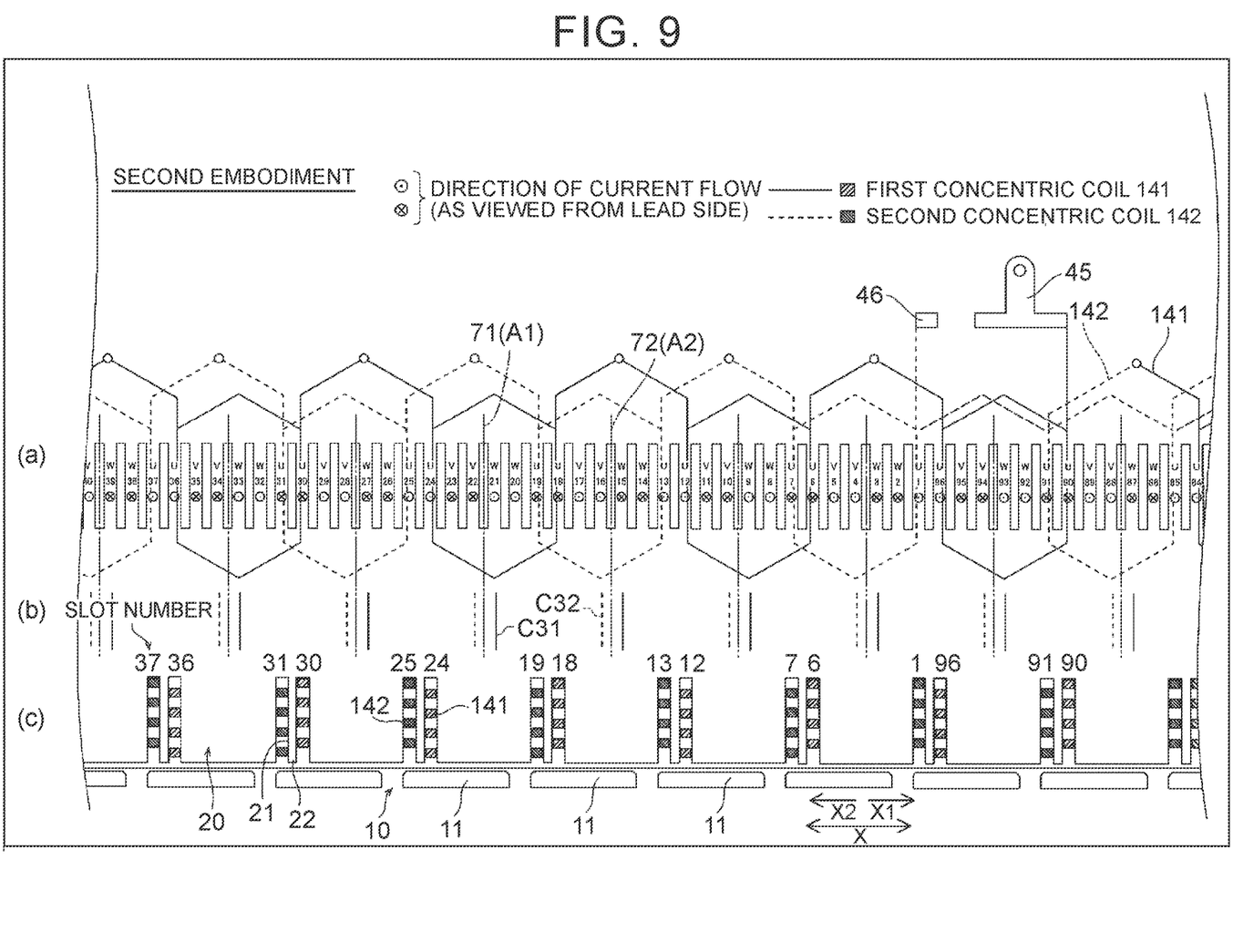
FIG. 9 is a partial enlarged view of FIG. 8, showing only a first concentric coil and a second concentric coil.

As shown in FIGS. 8 and 9, the coil center C31 of the first concentric coil 141 of the U-phase concentric coil 140 is located on one side (X1 direction side) in the circumferential direction with respect to the center A1 of the first magnetic pole 71. The coil center C32 of the second concentric coil 142 is located on the other side (X2 direction side) in the circumferential direction with respect to the center A2 of the second magnetic pole 72 adjacent to the first magnetic pole 71.

Figure 10:
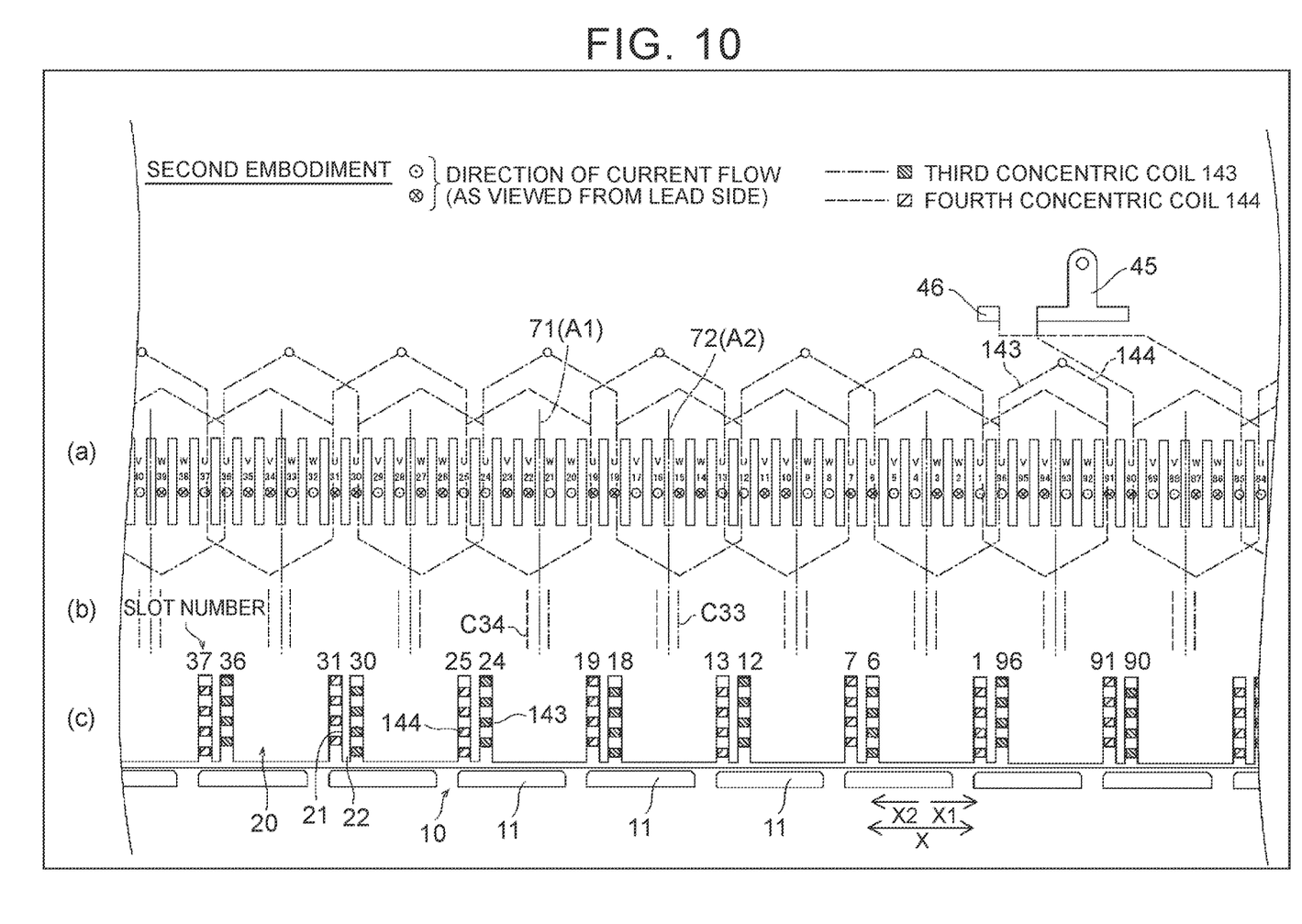
FIG. 10 is a partial enlarged view of FIG. 8, showing only a third concentric coil and a fourth concentric coil.

As shown in FIG. 10, the coil center C33 of a third concentric coil 143 is located on the one side in the circumferential direction with respect to the center A2 of the second magnetic pole 72, and the coil center C34 of a fourth concentric coil 144 is located on the other side in the circumferential direction with respect to the center of the first magnetic pole 71.

The first concentric coil 141 placed in the slot 21 of slot number 84 and the second concentric coil 142 placed in the slot 21 of slot number 91 are connected in series with each other. The third concentric coil 143 placed in the slot 21 of slot number 96 and the fourth concentric coil 144 placed in the slot 21 of slot number 91 are connected in series with each other.

That is, in the second embodiment, the first concentric coil 41 (see FIG. 7) and the fourth concentric coil 44 of the first embodiment are connected in series with each other, and the second concentric coil 42 and the third concentric coil 43 of the first embodiment are connected in series with each other.

The configuration of the second embodiment is otherwise similar to that of the first embodiment.

Effects of Second Embodiment

The second embodiment has the following effects. Although effects of the U-phase concentric coil 140 are described below, the V-phase concentric coil 150 and the W-phase concentric coil 160 also have effects similar to those of the U-phase concentric coil 140.

In the second embodiment, as described above, the coil center C31 of the first concentric coil 141 is located on the one side in the circumferential direction with respect to the center A1 of the first magnetic pole 71, and the coil center C32 of the second concentric coil 142 is located on the other side in the circumferential direction with respect to the center A2 of the second magnetic pole 72 adjacent to the first magnetic pole 71. The coil center C33 of the third concentric coil 143 is located on the one side in the circumferential direction with respect to the center A2 of the second magnetic pole 72, and the coil center C34 of the fourth concentric coil 144 is located on the other side in the circumferential direction with respect to the center A1 of the first magnetic pole 71. Even in the configuration of the second embodiment different from the first embodiment, the center of the set of the first concentric coil 141 and the second concentric coil 142 and the coil center of the set of the third concentric coil 143 and the fourth concentric coil 144 are located on the centers of the magnetic poles 70, whereby the balanced positional relationship between each permanent magnet 11 and each set can be maintained.

Other effects of the second embodiment are similar to those of the first embodiment.

Modifications

The embodiments disclosed herein are by way of example in all respects and should not be interpreted as restrictive. The scope of the present invention is defined by the claims rather than by the description of the above embodiments, and includes all changes (modifications) that fall within the scope of the claims and the meaning and scope of equivalence.

For example, the first and second embodiments are described with respect to the examples in which each of the coil centers of the first concentric coil and the third concentric coil is located at a position shifted by approximately ½ of the slot width to the one side with respect to the center of a magnetic pole and each of the coil centers of the third concentric coil and the fourth concentric coil is located at a position shifted by approximately ½ of the slot width to the other side with respect to the center of a magnetic pole. However, the present invention is not limited to this. In the present invention, each of the first to fourth concentric coils may be located at a position shifted by a distance other than approximately ½ of the slot width to the one side or the other side with respect to the center of a magnetic pole.

The first and second embodiments are described with respect to the examples in which the stator core has 96 slots. However, the present invention is not limited to this. In the present invention, the number of slots may be other than 96.

The first and second embodiments are described with respect to the examples in which the pitch of the first to fourth concentric coils is 6 slots. However, the present invention is not limited to this. In the present invention, the pitch of the first to fourth concentric coils may be other than 6 slots.

The first and second embodiments are described with respect to the examples in which the pitch of the connection portion in the first to fourth concentric coils is 6 slots. However, the present invention is not limited to this. In the present invention, the pitch of the connection portion in the first to fourth concentric coils may be other than 6 slots.

The first and second embodiments are described with respect to the examples in which the concentric coil includes the three-phase concentric coils. However, the present invention is not limited to this. In the present invention, the concentric coil may include concentric coils of the number of phases other than three.

The first and second embodiments are described with respect to the examples in which the three-phase concentric coils are connected in a Y-configuration. However, the present invention is not limited to this. In the present invention, the three-phase concentric coils may be connected in a Δ-configuration.

DESCRIPTION OF THE REFERENCE NUMERALS

10 Rotor Core
11 Permanent Magnet
20 Stator Core
21 Slot
30, 40, 50, 60, 140, 150, 160 Concentric Coil
41, 51, 61, 141 First Concentric Coil
42, 52, 62, 142 Second Concentric Coil
43, 53, 63, 143 Third Concentric Coil
44, 54, 64, 144 Fourth Concentric Coil
41a, 42a, 43a, 44a Coil Portion
41b, 42b, 43b, 44b Connection Portion
41c, 42c, 43c, 44c Set
70 Magnetic Pole
71 First Magnetic Pole
72 Second Magnetic Pole
100, 200 Rotating Electrical Machine
A1 Center (of First Magnetic Pole)
A2 Center (of Second Magnetic Pole)
C11, C12, C13, C14, C31, C32, C33, C34 Coil Center
C21, C22, C23, C24 Connection Center

The invention claimed is:

1. A rotating electrical machine, comprising:
a rotor core having a permanent magnet placed therein;
a stator core placed so as to face the rotor core in a radial direction and having a plurality of slots; and
a concentric coil formed by concentrically winding a wire and placed in the slots of the stator core, the concentric coil comprises a first slot accommodated portion that is accommodated in a predetermined slot among the plurality of slots of the stator core and a second slot accommodated portion that is accommodated in a slot different from the predetermined slot among the plurality of slots of the stator core with both a first coil end portion and a second coil end portion between the first slot accommodated portion and the second slot accommodated portion, wherein
a coil center is a line segment extending in an axial direction of the stator core and passing through the middle in the circumferential direction between the first slot accommodated portion and the second slot accommodated portion in the concentric coil,
a center of a respective magnet pole is a line segment extending in the axial direction and passing through the middle in the circumferential direction between coil centers of concentric coils of the same phase located next to each other in the circumferential direction,
the center of the respective magnetic pole is between the first slot accommodated portion and the second slot accommodated portion of both of the concentric coils of the same phase located next to each other in the circumferential direction,
the concentric coil includes a first concentric coil and a second concentric coil which are of the same phase and are connected in series with each other, and a third concentric coil and a fourth concentric coil which are of the same phase and are connected in series with each other,
the first concentric coil and the second concentric coil are connected in parallel with the third concentric coil and the fourth concentric coil, and
each of coil centers of the first concentric coil and the third concentric coil is located at a respective position shifted by a distance to a first direction in a circumferential direction with respect to the center of the respective magnetic pole, and each of coil centers of the second concentric coil and the fourth concentric coil is located at a respective position shifted by the distance to a second direction opposite to the first direction side in the circumferential direction with respect to the center of the respective magnetic pole.

2. The rotating electrical machine according to claim 1, wherein
each of the first concentric coil, the second concentric coil, the third concentric coil, and the fourth concentric coil has a plurality of coil portions formed by concentrically winding a wire, and a connection portion connecting the coil portions, a connection center being the center between two coil centers connected together,
a connection center in the connection portion of each of the first and third concentric coils is located at a respective position shifted by the distance to the first direction in the circumferential direction with respect to the center of the respective magnetic pole, and
a connection center in the connection portion of each of the second and fourth concentric coils is located at a respective position shifted by the distance to the second direction in the circumferential direction with respect to the center of the respective magnetic pole.

3. The rotating electrical machine according to claim 2, wherein
each of the first concentric coil, the second concentric coil, the third concentric coil and the fourth concentric coil has a plurality of sets of the coil portions and the connection portions, and
the plurality of sets of the coil portion and the connection portion are arranged in the circumferential direction.

4. The rotating electrical machine according to claim 3, wherein
the coil center of the first concentric coil is located at the position shifted by the distance to the first direction in the circumferential direction with respect to a center of a first magnetic pole, and the coil center of the second concentric coil is located at the position shifted by the distance to the second direction in the circumferential direction with respect to the center of the first magnetic pole, and
the coil center of the third concentric coil is located at the position shifted by the distance to the first direction in the circumferential direction with respect to a center of a second magnetic pole adjacent to the first magnetic pole, and the coil center of the fourth concentric coil is located at the position shifted by the distance to the second direction in the circumferential direction with respect to the center of the second magnetic pole.

5. The rotating electrical machine according to claim 4, wherein
a plurality of the permanent magnets are arranged at substantially regular angular intervals in the circumferential direction of the rotor core.

6. The rotating electrical machine according to claim 5, wherein
the concentric coil includes three-phase concentric coils,
each of the three-phase concentric coils includes the first concentric coil and the second concentric coil which are connected in series with each other, and the third concentric coil and the fourth concentric coil which are connected in series with each other, and
in each of the three-phase concentric coils, the first concentric coil and the second concentric coil are connected in parallel with the third concentric coil and the fourth concentric coil.

7. The rotating electrical machine according to claim 6, wherein
the three-phase concentric coils are connected in a Y-configuration.

8. The rotating electrical machine according to claim 3, wherein
the coil center of the first concentric coil is located at the position shifted by the distance to the first direction in the circumferential direction with respect to a center of a first magnetic pole, and the coil center of the second concentric coil is located at the position shifted by the distance to the second direction in the circumferential direction with respect to a center of a second magnetic pole adjacent to the first magnetic pole, and
the coil center of the third concentric coil is located at the position shifted by the distance to the first direction in the circumferential direction with respect to the center of the second magnetic pole, and the coil center of the fourth concentric coil is located at the position shifted by the distance to the second direction in the circumferential direction with respect to the center of the first magnetic pole.

9. The rotating electrical machine according to claim 1, wherein
the coil center of the first concentric coil is located at the position shifted by the distance to the first direction in the circumferential direction with respect to a center of a first magnetic pole, and the coil center of the second concentric coil is located at the position shifted by the distance to the second direction in the circumferential direction with respect to the center of the first magnetic pole, and
the coil center of the third concentric coil is located at the position shifted by the distance to the first direction in the circumferential direction with respect to a center of a second magnetic pole adjacent to the first magnetic pole, and the coil center of the fourth concentric coil is located at the position shifted by the distance to the second direction in the circumferential direction with respect to the center of the second magnetic pole.

10. The rotating electrical machine according to claim 1, wherein
the coil center of the first concentric coil is located at the position shifted by the distance to the first direction in the circumferential direction with respect to a center of a first magnetic pole, and the coil center of the second concentric coil is located at the position shifted by the distance to the second direction in the circumferential direction with respect to a center of a second magnetic pole adjacent to the first magnetic pole, and
the coil center of the third concentric coil is located at the position shifted by the distance to the first direction in the circumferential direction with respect to the center of the second magnetic pole, and the coil center of the fourth concentric coil is located at the position shifted by the distance to the second direction in the circumferential direction with respect to the center of the first magnetic pole.

11. The rotating electrical machine according to claim 1, wherein
a plurality of the permanent magnets are arranged at substantially regular angular intervals in the circumferential direction of the rotor core.

12. The rotating electrical machine according to claim 1, wherein
the concentric coil includes three-phase concentric coils,
each of the three-phase concentric coils includes the first concentric coil and the second concentric coil which are connected in series with each other, and the third concentric coil and the fourth concentric coil which are connected in series with each other, and in each of the three-phase concentric coils, the first concentric coil and the second concentric coil are connected in parallel with the third concentric coil and the fourth concentric coil.

13. The rotating electrical machine according to claim 1, wherein the concentric coil includes three phase concentric coils, and the three-phase concentric coils are connected in a Y-configuration.

* * * * *